(12) United States Patent
Kuri et al.

(10) Patent No.: US 7,006,772 B2
(45) Date of Patent: Feb. 28, 2006

(54) METHOD AND APPARATUS FOR TRANSMITTING HIGH-FREQUENCY SIGNALS IN OPTICAL COMMUNICATION SYSTEM

(75) Inventors: Toshiaki Kuri, Tokyo (JP); Wataru Chujo, Tokyo (JP); Ken-ichi Kitayama, Tokyo (JP)

(73) Assignee: National Institute of Information and Communications Technology, Koganei (JP)

( * ) Notice: Subject to any disclaimer, the term of this patent is extended or adjusted under 35 U.S.C. 154(b) by 573 days.

(21) Appl. No.: 09/886,257

(22) Filed: Jun. 22, 2001

(65) Prior Publication Data
US 2001/0055137 A1  Dec. 27, 2001

(30) Foreign Application Priority Data
Jun. 22, 2000  (JP)  ............................. 2000-188363

(51) Int. Cl.
*H04B 10/00*  (2006.01)
(52) U.S. Cl. ..................................... 398/204; 398/202
(58) Field of Classification Search ......... 398/202–214
See application file for complete search history.

(56) References Cited

U.S. PATENT DOCUMENTS

| | | | |
|---|---|---|---|
| 3,530,298 A | 9/1970 | Hubbard et al. | |
| 5,140,453 A | 8/1992 | Tsushima et al. | |
| 5,546,190 A | 8/1996 | Hill et al. | |
| 5,896,216 A * | 4/1999 | Kikushima et al. | ......... 398/176 |

FOREIGN PATENT DOCUMENTS

| | | |
|---|---|---|
| JP | 6-152565 | 5/1994 |
| JP | 2000-244397 | 9/2000 |

* cited by examiner

*Primary Examiner*—Agustin Bello (57) ABSTRACT

A method for transmitting high-frequency signals in an optical communication system includes combining an optical signal, the first optical local component from a local light source and the second optical local component from the local light source having a predetermined frequency differential from the first optical local component, selecting the first high-frequency signal which consists of two predetermined electrical components from plural electrical components obtained by the optical frequency mixing process, and mixing the two selected electrical components included in the first high-frequency signal.

54 Claims, 7 Drawing Sheets

METHOD AND APPARATUS FOR TRANSMITTING HIGH-FREQUENCY SIGNALS IN OPTICAL COMMUNICATION SYSTEM

BACKGROUND OF THE INVENTION

1. Field of the Invention

This invention relates to a method and apparatus for transmitting high-frequency signals in an optical communication system. Especially, the invention relates to a method and apparatus for transmitting high-frequency subcarrier signals in an optical communication system that utilizes the optical heterodyne detection technique with a dual-mode local light source and is hard to be affected by phase noise of light sources.

2. Description of the Prior Art

It has been theoretically proven that receiving sensitivity of coherent optical communication systems with strong local light is superior to that of conventional intensity-modulation/direct-detection systems. Therefore, the coherent optical communication systems had been looked to as a next-generation optical communication system. However, optical amplifiers have been developed in recent years in order to improve the receiving sensitivity of existing systems, and this, together with the difficulty of controlling the local light source to reduce phase-noise effect from light sources in coherent optical communication systems, means that coherent optical communication systems are not yet practical.

Figure 2:
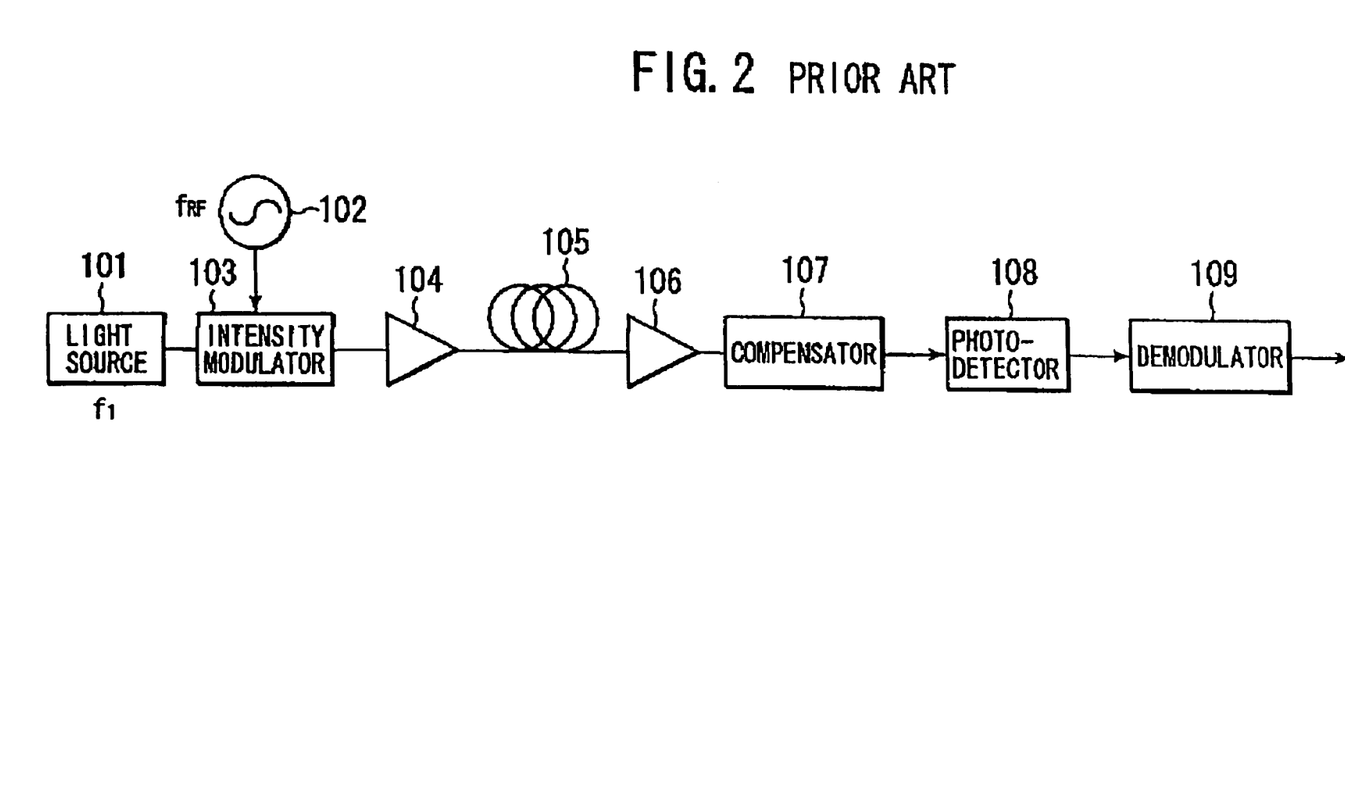
FIG. 2 is a schematic diagram of an example of a conventional radio-on-fiber system.

In conventional optical fiber systems transmitting high-frequency signals, an optical carrier from a light source is modulated, amplified if necessary, and transmitted to a remote site. The optical signal is again amplified if the transmission attenuates the signal power, and then demodulated. FIG. 2 shows an example of such a configuration, which comprises a single-mode light source 101, a high-frequency signal 102, an optical modulator 103, an optical amplifier 104, an optical transmission line 105, another optical amplifier 106, a compensator 107 that compensates for the optical-fiber dispersion effect, a photo-detector 108, and a demodulator 109 that demodulates the high-frequency signal detected by the photo-detector 108.

An optical carrier emitted by the light source 101 is modulated with the optical modulator 103 by the high-frequency signal 102 with payload data. The optical amplifier 104 amplifies the modulated optical signal up to the required power for transmission, and then the amplified optical signal is transmitted along the optical transmission line 105. To compensate for transmission loss and insertion loss due to the optical-fiber dispersion compensator 107, the optical amplifier 106 in front of the optical-fiber dispersion compensator 107 amplifies again the optical signal. To eliminate any effect from optical-fiber dispersion arising in the following photo-detection stage, the optical-fiber dispersion compensator 107 performs compensation on a wavelength-by-wavelength basis. The received optical signal is directly detected by the photo-detector 108, and then the photo-detected signal is demodulated with the demodulator 109 to recover the payload data.

In the conventional system, in order to extend the transmission distance, it has been necessary to use multiple optical amplifiers to increase the received signal power to a level large enough to ensure the desired communication quality. However, light that is spontaneously emitted from an optical amplifier is amplified with the following optical amplifiers, causing accumulation of spontaneously emitted light. This spontaneously emitted light cannot be removed any longer in the case of analog optical communication systems. Once it is detected by the photo-detector, the spontaneously emitted light forms noise that corrupts the desired signal quality. The noise is well-known as an amplified spontaneous emission (ASE) noise. Moreover, in the conventional system additional optical-fiber dispersion compensators must be added to nullify the effect of the optical-fiber dispersion. However, since the dispersion effect strongly depends on both the wavelength and the transmission distance involved, the optical-fiber dispersion compensators must have been individually adjusted, making the configuration of the optical communication systems more complex.

In view of the foregoing, an object of the present invention is to provide an optical communication system not only that does not need to use any optical amplifiers that give rise to ASE noise, but also in which phase noise of light sources is removed in principle.

Another object of the invention is to provide a system that is not affected by optical fiber dispersion effect, thereby eliminating the use of additional optical-fiber dispersion compensators that are required in the conventional system.

SUMMARY OF THE INVENTION

The optical communication system according to this invention transmits an optical carrier that is modulated by a high-frequency signal with payload data. On the receiving side, the optical signal is detected by the optical heterodyne detection technique with a dual-mode local light. The optical carrier component and a desired optical sideband component are extracted from photo-detected signals in the first intermediate-frequency-band, and the two extracted signals are cross-multiplied, converting to a desired signal in the second intermediate-frequency-band. The same amount of the inherent phase noise of both the light source generating the optical carrier and the dual-mode local light source generating the local light, which is included each in the extracted signal from the first intermediate-frequency-band signals, is differentially removed when the cross-multiplying is performed.

In accordance with the first aspect of the invention, the above objects are attained by a method for transmitting high-frequency signals in an optical communication system, comprising the steps of combining an optical signal, a first optical local component from a local light source, and a second optical local component from the local light source having a predetermined frequency differential from the first optical local component, selecting a first high-frequency signal which consists of two predetermined electrical components from plural electrical components obtained by an optical frequency mixing process, and mixing the two selected electrical components included in the first high-frequency signal.

The second aspect of the method of the invention relates to the use of intermediate-frequency-band signals, and comprises the steps of transmitting an optical signal that includes an optical carrier component and an optical sideband component obtained by modulation with a high-frequency signal whose frequency is predetermined, combining the optical signal, a first optical local component from a local light source, and a second optical local component from the local light source having a predetermined frequency differential from the first optical local component, selecting a first high-frequency signal which consists of two predetermined electrical components from plural photo-detected electrical components obtained by an optical frequency mixing process, and selecting a second high-frequency signal whose frequency is lower by an amount of predetermined frequency differential than a carrier frequency or the first high-frequency signal obtained by the optical frequency mixing process.

The third aspect relates to demodulation by optical frequency mixing, and comprises the steps of transmitting an optical signal that includes an optical carrier component and an optical sideband component obtained by modulation with a high-frequency signal whose frequency is predetermined, extracting an original high-frequency signal from the transmitted optical signal, combining the optical signal, a first optical local component from a local light source and a second optical local component from the local light source having a predetermined frequency differential from the first optical local component, making a carrier frequency of the extracted original high-frequency signal coincide with the predetermined frequency differential, and selecting two predetermined electrical components from plural electrical components obtained by an optical frequency mixing process, In accordance with a fourth aspect, which relates specifically to the use of optical filtering, the method of the invention comprises the steps of transmitting an optical signal that includes an optical carrier component and an optical sideband component obtained by modulation with a high-frequency signal whose frequency is predetermined, combining the optical signal, a first optical local component from a local light source and a second optical local component from the local light source having a predetermined frequency differential from the first optical local component, selecting, as a first optical signal, lights containing the optical sideband component included in the optical signal and the first optical local component from the local light source, selecting, as a second optical signal, lights containing the optical carrier component included in the optical signal and the second optical local component from the local light source, and selecting a signal with a relatively low frequency after mixing the first and second optical signals.

In accordance with a fifth aspect of the invention, the above objects are attained by an apparatus for transmitting high frequency signals in an optical communication system, the apparatus comprising means for combining an optical signal, a first optical local component from a local light source and a second optical local component from the local light source having a predetermined frequency differential from the first optical local component, means for selecting a first high-frequency signal which consists of two predetermined electrical components from plural electrical components obtained by an optical frequency Axing process, and means for mixing the two selected electrical components included in the first high-frequency signal.

In a sixth aspect relating specifically to the use of intermediate-frequency-band signals, the apparatus comprises means for transmitting an optical signal that includes an optical carrier component and an optical sideband component obtained by modulation with a high-frequency signal whose frequency is predetermined, means for combining the optical signal, a first optical local component from a local light source and a second optical local component from the local light source having a predetermined frequency differential from the first optical local component, means for selecting a first high-frequency signal which consists of two predetermined electrical components from plural electrical components obtained by an optical frequency mixing process, and means for selecting a second high-frequency signal whose frequency is lower by an amount of predetermined frequency differential than a carrier frequency of the first high-frequency signal obtained by the optical frequency mixing process.

In a seventh aspect, the apparatus comprises means for transmitting an optical signal that includes an optical carrier component and an optical sideband component obtained by modulation with a high-frequency signal whose frequency is predetermined, means for extracting the original high-frequency signal from the transmitted optical sisal, means for combining the optical signal, a first optical local component from a local light source and a second optical local component from the local light source having a predetermined frequency differential from the first optical local component, means for making a carrier frequency of the extracted original high-frequency signal coincide with the predetermined frequency differential, and means for selecting two predetermined electrical components from plural electrical components obtained by an optical frequency mixing process.

In an eighth aspect, relating to the use of an optical filter, the apparatus comprises means for transmitting an optical signal that includes an optical carrier component and an optical sideband component obtained by modulation with a high-frequency signal whose frequency is predetermined, means for combining the optical signal, a first optical local component from a local light source and a second optical local component from the local light source having a predetermined frequency differential from the first optical local component, means for selecting, as a first optical signal, lights containing the optical sideband component included in the optical signal and the first optical local component from the local light source, means for selecting, as a second optical signal, lights containing the optical carrier component included in the optical signal and the second optical local component from the local light source, and means for selecting a signal with a relatively low frequency after mixing the first and second optical signals.

In a ninth aspects the arrangement used for generating optical signals that are to be transmitted comprises means for generating an optical carrier component with a single-mode light source that produces a single-mode optical carrier, and means for generating an optical sideband component obtained by modulating the optical carrier component by a high-frequency signal by means of optical modulation.

In a tenth aspect, which relates to the means of optical frequency mixing, the apparatus uses the combining means which has a configuration that projects plural light beams onto a photo-detector to be combined and extracts at least part of combined optical signal as electrical signals.

In an eleventh aspect, in order to eliminate the intensity fluctuations of light emitted from light sources, the photo-detector is configured as a balanced receiver.

In accordance with a twelfth aspect relating to the use of a dual-mode local light source, in the means for generating the first optical local component and the second optical local component having a predetermined frequency differential from the first optical local component, two desired continuous waves are obtained from an optical spectrum emitted from a pulsed light source; from an optical spectrum emitted from a pulsed light source using optical injection locking; by utilizing a light source that emits two adjacent lightwaves; and by selectively producing two lightwaves by modulating light from a single-mode light source.

The above and other objects and features of the invention will become apparent from the following description made with reference to the drawings.

DESCRIPTION OF THE PREFERRED EMBODIMENT

In the following, embodiments of the present invention are explained with reference to examples shown in the drawings. Throughout the embodiments illustrated in the drawings, identical reference symbols indicate parts having identical or similar functions or configurations. It is to be understood that the invention is not limited to the specific examples described hereinafter.

An optical communication system according to this invention transmits an optical carrier modulated by a high-frequency signal with payload data. This transmission is done without the signal being amplified. On the receiving side, a dual-mode local light source is utilized to implement signal detection by optical heterodyne detection. The optical carrier component and a desired optical sideband component are extracted from photo-detected signals in the first intermediate-frequency-band. The two extracted signals are cross-multiplied, converting the high-frequency signal in the first intermediate-frequency-band to a desired high-frequency signal in the second intermediate-frequency-band. The same amount of the inherent phase noise of both the light source generating the optical carrier and the dual-mode local light source generating the local light, which is included each in the extracted signal in the first intermediate-frequency-band, is differentially removed when the cross-multiplying is performed. With this invention, since only two optical components which are the optical carrier and one of the first-order optical sidebands are demodulated, there is little degradation of high-frequency signals caused by optical-fiber dispersion, compared to conventional methods.

Figure 1:
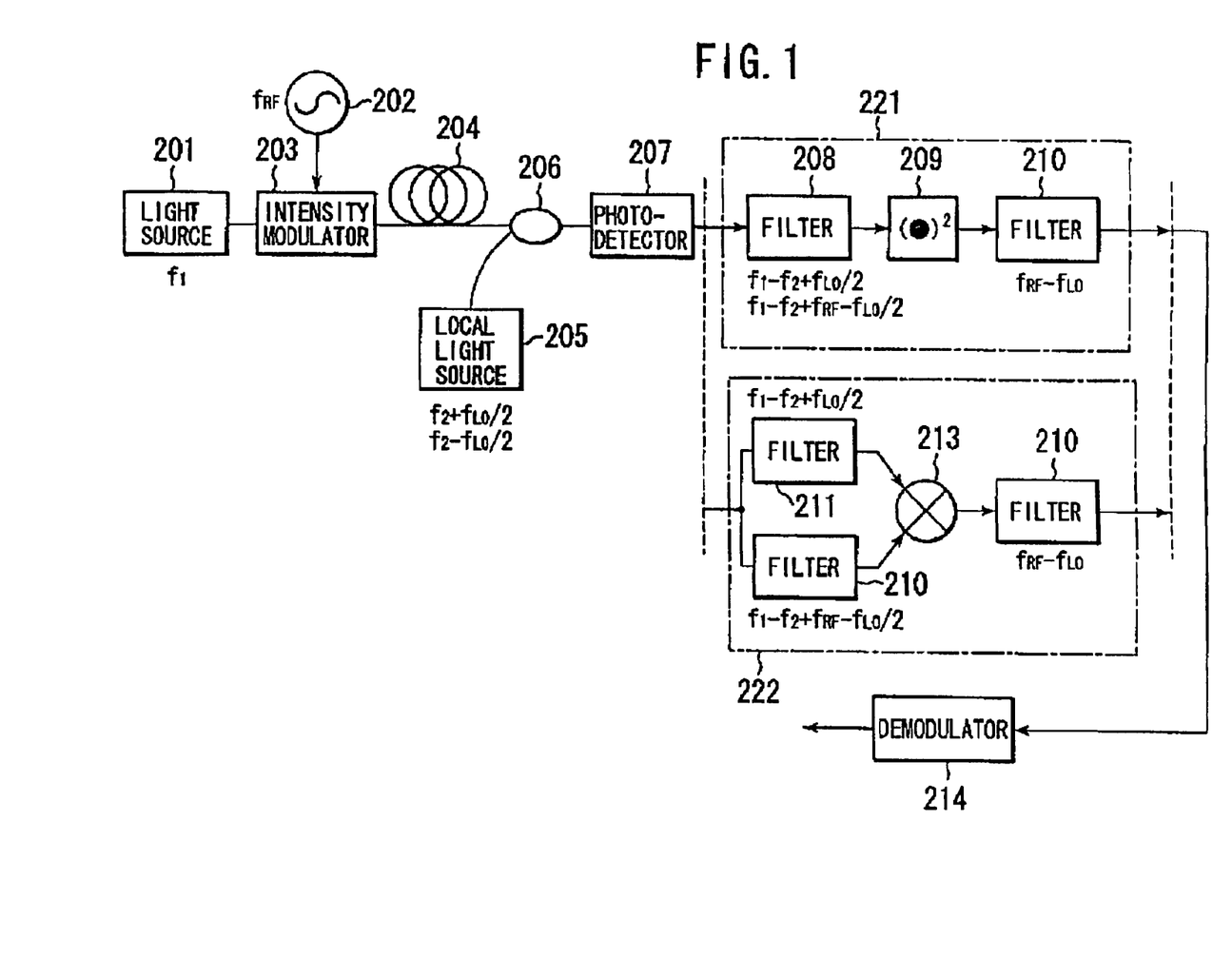
FIG. 1 is a schematic diagram of an optical communication system of a high-frequency Signal, according to the present invention.

The first embodiment of the present invention will now be described with reverence to the drawings. FIG. 1 shows an embodiment of the apparatus for transmitting high-frequency signals in an optical communication system, according to the present invention. In the drawing, reference numeral 201 denotes a single-mode light source driving at an operating wavelength of 1550.27 nm and an output power of 5 mW. Denoted by 202 is a high-frequency signal with the subcarrier frequency of 59.6 GHz and the principal bandwidth of 156 MHz×2 due to the payload data, by 203 is an optical intensity modulator, by 204 is an optical transmission line teat is five meters long, and by 205 is a dual-mode light source with operating wavelengths of 1549.92 nm and 1550.42 nm, each having an output power of 0.03 mW. References numeral 206 denotes an optical coupler, and numeral 207 denotes a photo-detector with the 3-dB bandwidth of 50 GHz. Denotes by 208, 211 and 212 are electrical filters with transfer characteristics ranging from 0.05 to 50 GHz. Reference numeral 209 denotes an electrical mixer with radio-frequency (RF) and local inputs having the bandwidth of 8 to 12.4 GHz and an intermediate-frequency output having the bandwidth of 0 to 3 GHz. Denoted by 210 is an electrical filter with a transfer characteristic in the 2 to 4 GHz region, by 213 is an electrical mixer having the same characteristics as the electrical mixer 209, and by 214 is an electrical demodulator in the second intermediate-frequency-band, Reference numeral 221 denotes the first phase-noise-canceling circuit and numeral 222 denotes the second phase-noise-canceling circuit.

Figure 3:
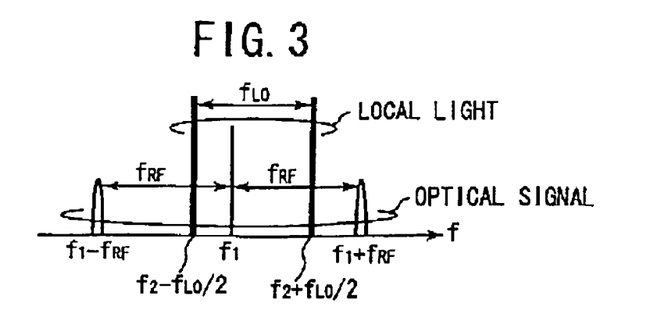
FIG. 3 is a diagram showing an example of optical spectra before photo-detection in the invented system.
Figure 4:
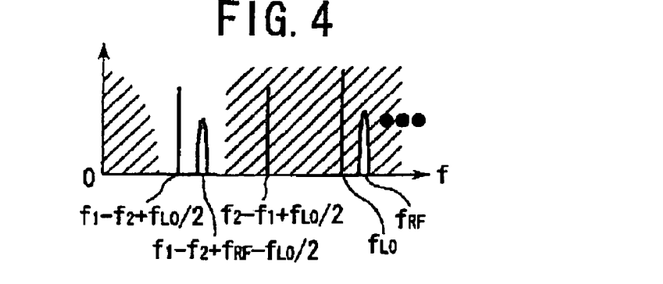
FIG. 4 is a diagram showing an example of spectra of electrical signals in the first intermediate-frequency-band.

In FIG. 1, an optical carrier $f_1$ emitted from the single-mode light source 201 is modulated in the optical intensity modulator 203 by the high-frequency signal 202 with the carrier frequency $f_{RF}$ and payload data. The optical intensity modulator 203 can be replaced with an amplitude modulator, a frequency modulator or a phase modulator. The high-frequency signal 202 intends to be a subcarrier signal. The modulated optical signal is transmitted to the receiving side via the optical transmission line 204. On the receiving side, the dual-mode light source 205 emits local lights in a two-frequency mode, with an frequency gap $f_{LO}$ that provides a slightly different frequency from the subcarrier frequency of the high-frequency signal 202; the frequencies being $(f_2-f_{LO}/2)$ and $(f_2+f_{LO}/2)$. The optical coupler 206 combines the local lights with the modulated optical signal. FIG. 3 illustrates the optical signal and the local lights in front of the photo-detector 207. The photo-detector 207 carries out optical heterodyne detection, resulting in that the local lights are mixed with the modulated optical signal. Here, the mixing means a field conversion Grieved by means of a substance having non-linear response characteristics. As a result of the detection, the photo-detector 207 generates plural photo-detected signals in the first intermediate-frequency-band, as shown in FIG. 4. The photo-detector 207 can be a photodiode or phototransistor. Using a photo-detector that is known to be a balanced receiver makes it possible to reduce the effect of intensity fluctuations in the optical carrier.

The photo-detected signals in the first intermediate-frequency-band are put into the first phase-noise-canceling circuit 221, where the hatched portion is removed by the electrical filter 208 to thereby extract only the desired signals of frequency $(f_1-f_2+F_{LO}/2)$ and $(f_1-f_2+f_{RF}-f_{LO}/2)$, and the two extracted signals are put into the electrical mixer 209 with a square-law response. The electrically mixed and down-converted signal is then passed through the next electrical filter 210 to obtain a desired signal in the second intermediate-frequency-band that has the desired frequency $(f_{RF}-f_{LO})$.

The second phase-noise-canceling circuit 222 can be replaced with the first phase-noise-canceling circuit 221, which might be preferable because of the better noise characteristics. In the second phase-noise-canceling circuit 222, the photo-detected signals in the first intermediate-frequency-band shown in FIG. 3 are split, with the electrical filter 211 being used to extract the first electrical component with the frequency $(f_1-f_2+f_{LO}/2)$ and the electrical filter 212 being used to extract the second electrical component with the frequency $(f_1-f_2+f_{RF}-f_{LO}/2)$. These electrical components are multiplied together with the electrical mixer 213 and extracted via the electrical filter 210 as the second intermediate-frequency-band signal with the frequency $(f_{RF}-f_{LO})$.

The phase-noise-canceling circuits shown here are examples of the usable configurations. Provided they can extract the second intermediate-frequency-band signal whose phase noise originating from light sources has been completely removed, there is no limitation on methods of the bandwidth limitation of the photo-detected signals in the first intermediate-frequency-band, the methods of the multiplication or the methods of the extraction of the second intermediate-frequency-band signal.

The second intermediate-frequency-band signal with the frequency of $(f_1-f_2+f_{RF}-f_{LO}/2)$ which is extracted by the electrical filters 221 and 222 is demodulated with the electrical demodulator 214 working in the second intermediate-frequency-band, by means of the well-known demodulating techniques.

There are a number of methods that can be used to produce the first optical local component from a local light source and the second optical local component from the local light source having a predetermined frequency differential from the first optical local component. These can be categorized as; (a) a method of extracting two continuous waves from the spectrum from a pulsed light source, (b) a method of extracting two continuous waves from the spectrum from a pulsed light source that uses an optical injection-locking technique, (c) a method of utilizing a light source that emits two adjacent lightwaves, and (d) a method of modulating light from a single-mode light source and selectively generating two lightwaves. Especially, methods that can be used include (1) using an optical filter to extract two desired lightwaves from a mode-locked laser diode; (2) using a dual-mode laser diode; (3) using an optical filter to extract two desired lightwaves from a pulsed optical-fiber laser; (4) generating two lightwaves by optical injection locking of a laser; (5) generating two desired lightwaves by four-wave-mixing in an optical non-linear device; (6) selecting two optical sideband components by sinusoidal modulation of an optical carrier from a single-mode laser; and (7) generating two desired lightwaves by resolving degeneration caused by Zeeman division.

From the above explanation, the modulation scheme of high-frequency signals can be of analog or digital. There is no particular limitation on modulation methods, multiplexing methods or access methods. However, the electrical demodulator 214 in the second intermediate-frequency-band should be a demodulator to cope with the modulation format of the original high-frequency signal. Considering such analog modulation systems that an optical carrier is modulated by a high-frequency signal, either linear or non-linear modulation may be employed. When frequency modulation is used, the phase-noise-canceling circuit can be provided with a frequency discriminator, as in the case of phase modulation.

Figure 5:
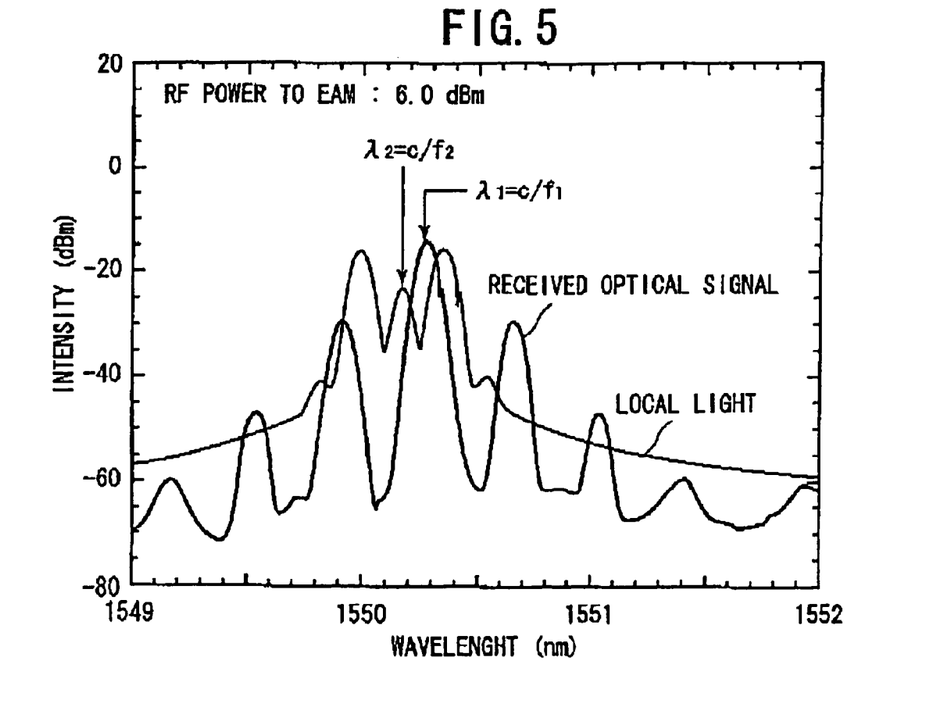
FIG. 5 shows the measured spectra of a received optical signal and a dual-mode local light.

FIG. 5 shows the measured optical spectrum in the case of the above configuration. Here, the local light is obtained by suppressed-carrier double-sideband modulation using a Mach-Zehnder type intensity modulator. In this example, because the carrier suppression was insufficient, the undesired optical carrier component at frequency $f_2$ reined.

Figure 6:
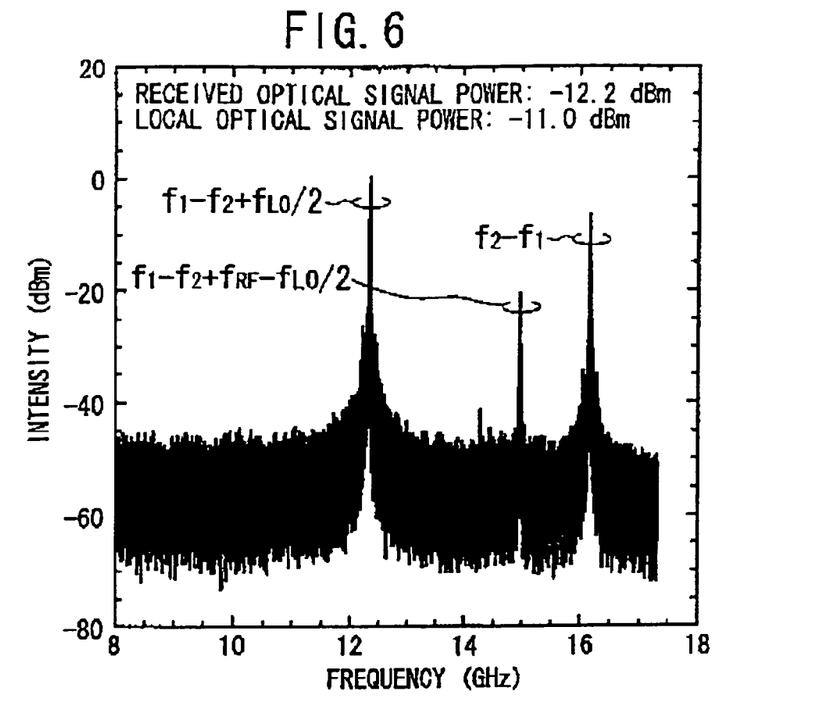
FIG. 6 shows the measured spectra of electrical signals in the first intermediate-frequency-band.
Figure 7:
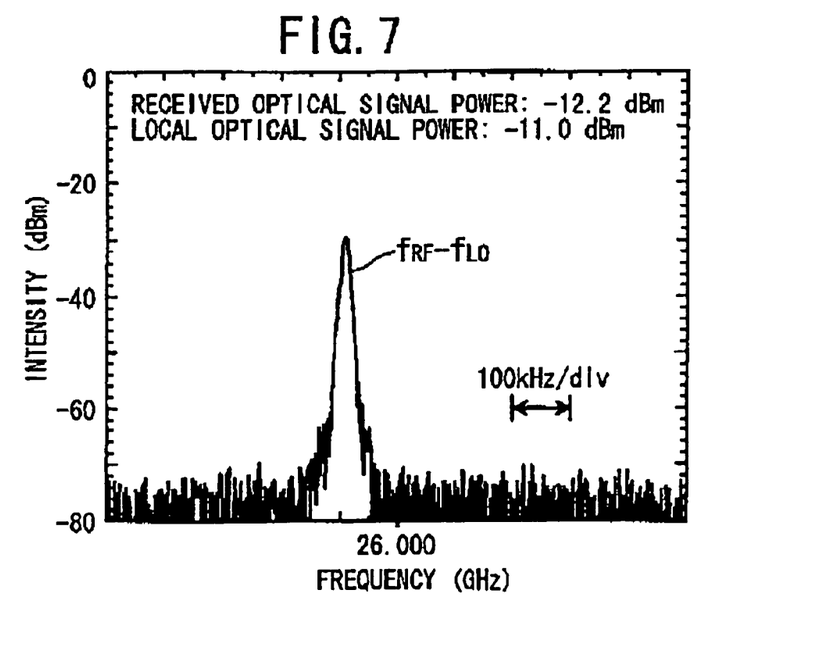
FIG. 7 shows the measured spectra of electrical signals in the second intermediate-frequency-band.

FIG. 6 shows the measured spectrum of photo-detected signals in the first intermediate-frequency-band in the above configuration. The spectrum broadening included in each photo-detected signals is caused by phase noise of light sources. The undesired optical carrier component in the local light produces an undesired electrical component with the frequency of $(f_2-f_1)$ after photo-detection. However, since the electrical filters 208, 211, and 212 can easily filter out the Undesired component, the undesired component will not affect the following electrical processing. FIG. 7 shows the measured spectrum of the second intermediate-frequency-band signal, which is the output of the electrical mixer 209 in the above configuration. The multiplication operation differentially removes the phase noise originating from light sources, leaving just the second intermediate-frequency-band signal purely with the desired frequency $(f_{RF}-f_{LO})$. Measurements show that the line-width of the second intermediate-frequency-band signal was less than 30 Hz, and single-sideband phase noise was −73 dB/Hz at 10 kHz apart from the carrier. These good results show that the optical heterodyne detection in this invention is not substantially affected by any phase noise of light sources.

Figure 8:
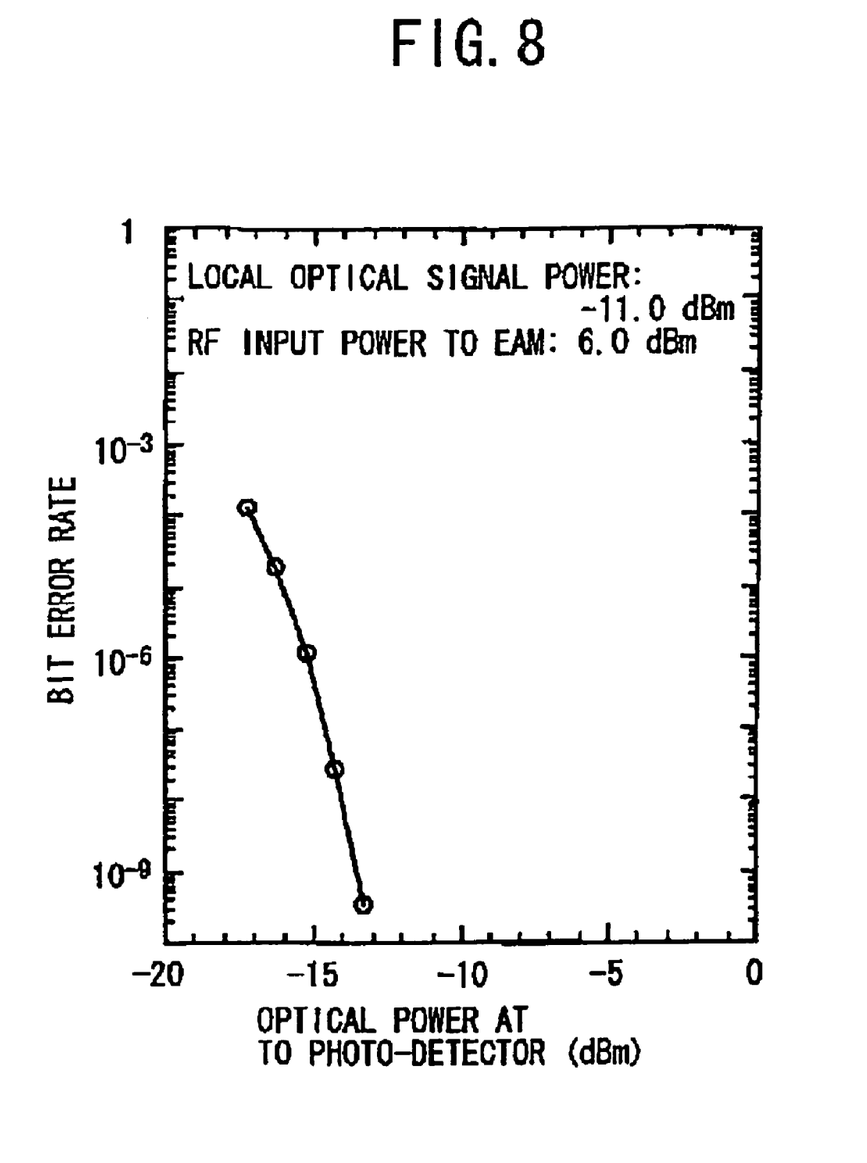
FIG. 8 shows the measured bit error rate.

FIG. 8 shows the measured bit error rate for transmission of a millimeter-wave-band, high-frequency signal with the differential-phase-shift-keying-format data of 155.52 Mb/s and the carrier frequency of 59.6 GHz. The bit error rate is shown as a function of the optical power put into the photo-detector. From the figures it can be seen that when there is an attenuation of 2 dB, that is, when the transmission is along a 10-kilometer-long optical fiber with the transmission loss of 0.2 dB/km, a bit error rate of less than $10^{-9}$ can be achieved.

Figure 9:
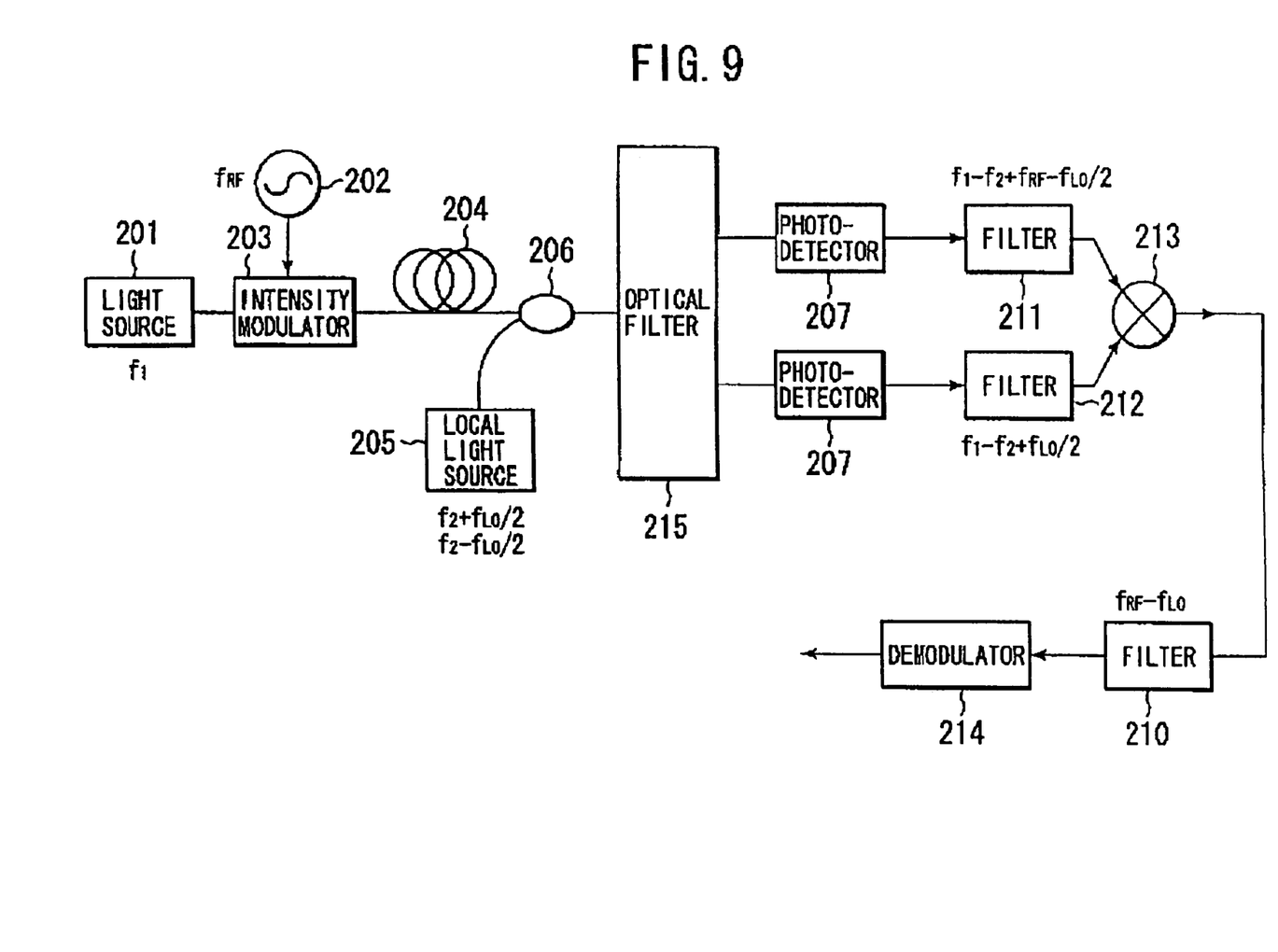
FIG. 9 is a schematic diagram of the second embodiment of the present invention.

FIG. 9 illustrates the second embodiment of the present invention. In this configuration, an optical signal received at the optical coupler 206 and dual-mode local light from the dual-mode local light source 205 are combined. Then, an optical filter 215 is used to select the first group of optical components comprising an optical sideband component included in the optical signal and the first local light component, and to select the second group of optical components comprising an optical carrier component included in the optical signal arc the second local light component. By individually Mixing optical components each in the group with the photo-detector 207, photo-detected signals in the first intermediate-frequency-band are generated. By passing the photo-detected signals through electrical filters 211 and 212, the desired electrical component at $(f_1-f_2+f_{RF}-f_{LO}/2)$ and $(f_1-f_2+f_{LO}/2)$ are respectively filtered out. After processing the electrical component at $(f_1-f_2+f_{RF}-f_{LO}/2)$ and $(f_1-f_2+f_{LO}/2)$ with the multiplier 213 and passing the result through the electrical filter 210, just a desired signal in the second intermediate-frequency-band at the frequency of $(f_{RF}-f_{LO})$ is obtained. The filter 215 can be a Fabry-Perot type filter, an arrayed waveguide grating, and so on.

Figure 10:
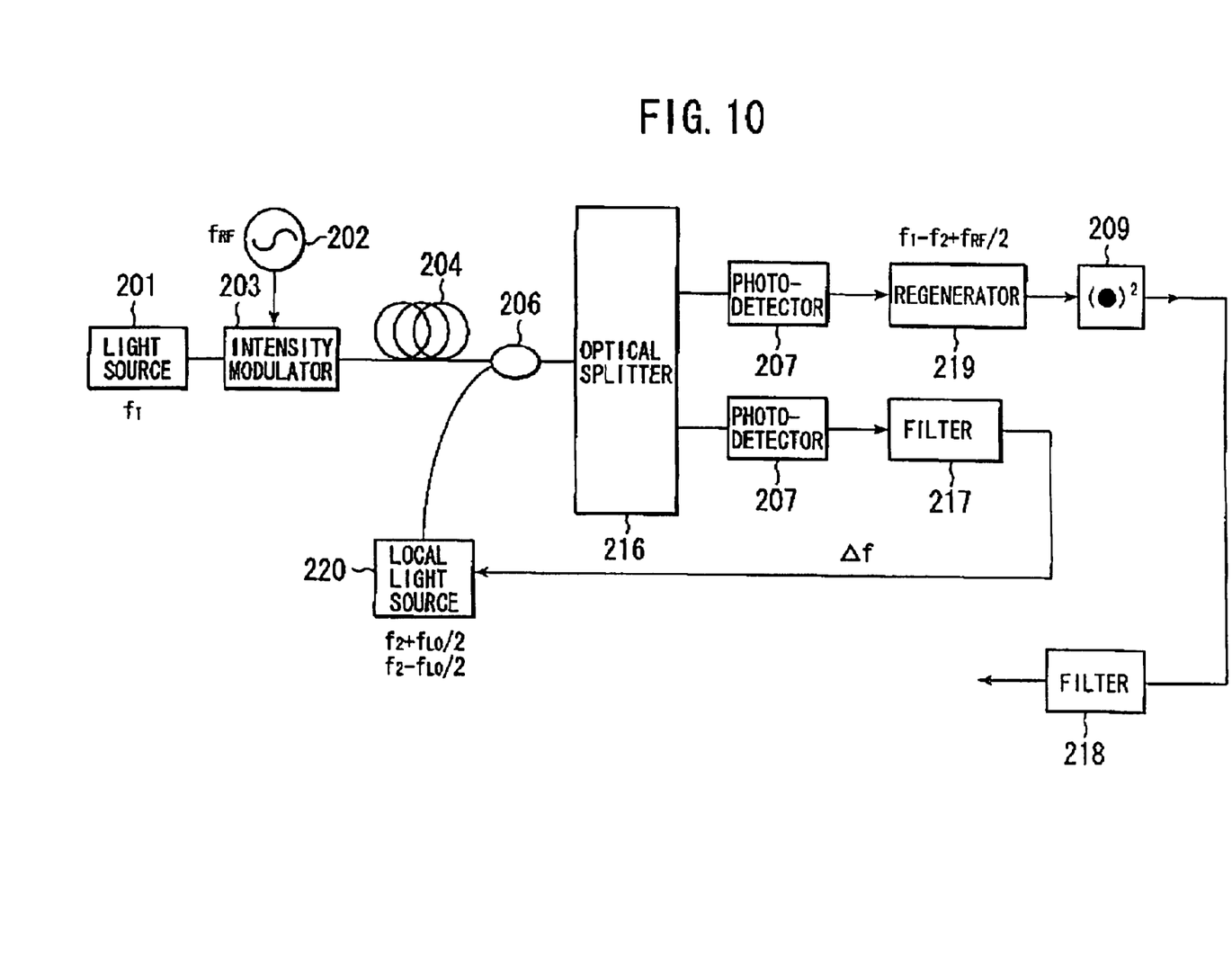
FIG. 10 is a schematic diagram of the third embodiment of the present invention.

FIG. 10 illustrates the third embodiment of the present invention. In this arrangement, the received optical signal is demodulated by being mixed directly with the local light, without a step of the electrical processing in the second intermediate-frequency-band. In the configuration shown in FIG. 10, the optical signal received at the optical coupler 206 and the dual-mode local light from a local light source 220 that is functionally equivalent to a dual-mode light source are combined and passed through an optical splitter 216. A fraction of the optical signal is used to extract a high-frequency signal with the frequency of $f_{RF}$ from the photo-detector 207, and a subcarrier regenerator 219 is used to extract the subcarrier frequency $f_{RF}$ thereof, and the output is made to coincide with the frequency gap between the local lights from the local light source 220. This coincidence is accomplished by the well-known phase-locking method. Providing the optical local source 220 with the ability to make the signals coincide with each other enables a phaselocked loop to be formed by the optical local source 220, optical coupler 206, optical splitter 216, optical detector 207 and subcarrier regenerator 219. Therefore, when the signals coincide, the information on the high-frequency signal 202 and $f_{RF}$ can be directly demodulated by using another electrical filter 217 to extract the signals in the first intermediate-frequency-band at around $(f_1-f_2+f_{RF}/2)$ from the other photo-detector 207 and multiplying the signals themselves in the electrical mixer 209 with the square-law response. The frequency- and phase-locking methods in the above phase-locking loop at $f_{RF}$ can be performed by using the other methods already known, and are not limited to the above method.

In the invention according to the first and fifth aspects, in coherent optical communication, if optical heterodyne detection using a dual-mode local light is adopted, phase noise from light sources does not affect the demodulation. Cost Deduction is also possible because of the cost-effective electrical circuit in the receiver working at lower frequency. In accordance with the second and sixth aspects, a high-frequency signal can be transmitted and demodulated even without optical amplifiers, by getting the gain of the optical heterodyne receiver. It also makes it possible to prevent the demodulated sill being affected by phase noise of light sources. Moreover, it eliminates the need to use additional optical filters and optical-fiber dispersion compensators highly depending not only on the optical carrier wavelength but also on the distance traveling along the optical transmission line. The result is greater flexibility with respect to configuring an optical communication system.

The third and seventh aspects of the invention also enable transmission and demodulation of a high-frequency signal, by utilizing the gain of the optical heterodyne receiver, without optical amplifiers. And, the demodulated signal is not affected by phase noise of light sources. Since the received signal is directly demodulated, the configuration can be simplified.

In the case of the fourth and eighth aspects, the desired signal frequency is selected at the post photo-detection stage, making it possible to simplify the following electrical processor The ninth aspect eliminates an extraneous source originating from background noise, so the apparatus is simplified, since it is only necessary to handle light of a single frequency for the first carrier. In the case of the tenth aspect a photo-detector is used to mix the light, resulting in more efficient conversion than that achieved using an optical non-linear device.

In accordance with the eleventh aspect, the photo-detector that mixes the lights is a balanced receiver, and it reduces the effect of intensity fluctuations on the demodulated signal.

In the twelfth aspect, two continuous waves are obtained from optical spectrum emitted from a pulsed light source, or from a pulsed light source with optical injection locking, or by utilizing a light source that emits two adjacent lightwaves, or by selectively producing two lightwaves by modulating light from a single-mode light source. This facilitates the construction of an optical heterodyne detection using a dual-mode local light source.

What is claimed is:

1. A method comprising the steps of:
modulating an optical signal with a high-frequency signal and sending the modulated optical signal;
receiving the modulated optical signal;
combining the received modulated optical signal, a first optical local component from a local light source and a second optical local component from the local light source to produce an electrical signal which includes plural electrical components, said second optical local component having a predetermined frequency differential relative to a predetermined frequency of the first optical local component;
selecting a first electrical component from said plural electrical components, said selected first electrical component being a frequency-shifted carrier component obtained from the combining of the modulated optical signal with the first optical local component;
selecting a second electrical component from said plural electrical components, said selected second electrical component being a frequency-shifted sideband component obtained from the combining of the modulated optical signal with the second optical local component; and
demodulating to provide an output high-frequency signal using the first and second electrical components.

2. A method comprising the steps of:
modulating an optical signal with a high-frequency signal of a predetermined frequency to provide an optical carrier component and an optical sideband component;
sending the modulated optical signal;
receiving the modulated optical signal;
combining the received modulated optical signal, a first optical local component from a local light source and a second optical local component from the local light source to produce an electrical signal which includes plural high-frequency electrical signal components, said second optical local component having a predetermined frequency differential relative to a predetermined frequency of the first optical local component;
selecting a first high-frequency electrical signal component from said plural high-frequency electrical signal components, said first high-frequency electrical signal component including a frequency-shifted carrier component obtained from the combining of the modulated optical signal with the first optical local component and including a frequency-shifted sideband component obtained from the combining of the modulated optical signal with the second optical local component;
combining the frequency-shifted carrier component and the frequency-shifted sideband component;
selecting a second high-frequency electrical signal component having a frequency lower by an amount of the predetermined frequency differential relative to a carrier frequency of the first high-frequency electrical signal component; and
demodulating to provide an output high-frequency electrical signal using the second high-frequency electrical signal component.

3. A method for transmitting high-frequency signals in an optical communication system, the method comprising the steps of:
transmitting an optical signal that includes an optical carrier component and an optical sideband component obtained by modulation with a high-frequency signal whose frequency is predetermined;
extracting an original high-frequency signal from the transmitted optical signal;
combining an optical signal, a first optical local component from a local light source and a second optical local component from the local light source having a predetermined frequency differential from the first optical local component;
making a carrier frequency of the extracted original high-frequency signal coincide with the predetermined frequency differential; and selecting two predetermined electrical components from plural electrical components obtained by an optical frequency mixing process.

4. A method for transmitting high-frequency signals in an optical communication system, the method comprising the steps of:

transmitting an optical signal that includes an optical carrier component and an optical sideband component obtained by modulation with a high-frequency signal whose frequency is predetermined;

combining an optical signal, a first optical local component from a local light source and a second optical local component from the local light source having a predetermined frequency differential from the first optical local component;

selecting, as a first optical signal, lights containing the optical sideband component included in the optical signal and the first optical local component from the local light source;

selecting, as a second optical signal, lights containing the optical carrier component included in the optical signal and the second optical local component from the local light source; and selecting a signal with a relatively low frequency after mixing the first and second optical signals.

5. An apparatus comprising:

means for modulating an optical signal with a high-frequency signal and sending the modulated optical signal;

means for receiving the modulated optical signal;

means for combining the received modulated optical signal, a first optical local component from a local light source and a second optical local component from the local light source to produce an electrical signal which includes plural electrical components, said second optical local component having a predetermined frequency differential relative to a predetermined frequency of the first optical local component;

means for selecting a first electrical component from said plural electrical components, said first electrical component being a frequency-shifted carrier component obtained from the combining of the modulated optical signal with the first optical local component;

means for selecting a second electrical component from said plural electrical components, said second electrical component being a frequency-shifted sideband component obtained from the combining of the modulated optical signal with the second optical local component; and means for demodulating to provide an output high-frequency signal using the first and second electrical components.

6. An apparatus comprising:

means for modulating an optical signal with a high-frequency signal of a predetermined frequency to provide an optical carrier component and an optical sideband component;

means for sending the modulated optical signal;

means for receiving the modulated optical signal;

means for combining the received modulated optical signal, a first optical local component from a local light source and a second optical local component from the local light source to produce an electrical signal which includes plural high-frequency electrical signal components, said second optical local component having a predetermined frequency differential relative to a predetermined frequency of the first optical local component;

means for selecting a first high-frequency electrical signal component from said plural high-frequency electrical signal components, said first high-frequency electrical signal component including a frequency-shifted carrier component obtained from the combining of the modulated optical signal with the first optical local component and including a frequency-shifted sideband component obtained from the combining of the modulated optical signal with the second optical local component;

means for combining the frequency-shifted carrier component and the frequency-shifted sideband component;

means for selecting a second high-frequency electrical signal component having a frequency lower by an amount of the predetermined frequency differential relative to a carrier frequency of the first high-frequency electrical signal component; and means for demodulating to provide an output high-frequency signal using the second high-frequency electrical signal component.

7. An apparatus for transmitting high-frequency signals in an optical communication system, the apparatus comprising:

means for transmitting an optical signal that includes an optical carrier component and an optical sideband component obtained by modulation with a high-frequency signal whose frequency is predetermined;

means for extracting an original high-frequency signal from the transmitted optical signal;

means for combining an optical signal, a first optical local component from a local light source and a second optical local component from the local light source having a predetermined frequency differential from the first optical local component;

means for making a carrier frequency of the extracted original high-frequency signal coincide with the predetermined frequency differential; and means for selecting two predetermined electrical components from plural electrical components obtained by an optical frequency mixing process.

8. An apparatus for transmitting high-frequency signals in an optical communication system, the apparatus comprising:

means for transmitting an optical signal that includes an optical carrier component and an optical sideband component obtained by modulation with a high-frequency signal whose frequency is predetermined;

means for combining an optical signal, a first optical local component from a local light source and a second optical local component from the local light source having a predetermined frequency differential from the first optical local component;

means for selecting, as a second optical signal, lights containing the optical carrier component included in the optical signal and the second optical local component from the local light source; and means for selecting a signal with a relatively low frequency after mixing the first and second optical signals.

9. An apparatus according to claim 5 or claim 6, further comprising:

means for generating the optical signal with a single-mode light source that produces a single-mode optical carrier; and means for generating the modulated optical signal, by modulating the optical signal by the high-frequency signal by optical modulation.

10. An apparatus according to claim 5 or claim 6, wherein the means for combining projects plural light beams onto a photo-detector to combine the plural light beams and convert the combined beams to the electrical signal.

11. An apparatus according to claim 10, wherein the photo-detector has a configuration of a balanced receiver.

12. An apparatus according to claim 5 or claim 6, wherein the local light source comprises:
means for generating the first optical local component and the second optical local component; and
means for extracting two predetermined continuous waves from an optical spectrum emitted from a pulsed light source.

13. An apparatus according to claim 5 or claim 6, wherein the local light source comprises:
means for generating the first optical local component and the second optical local component; and
means for extracting two predetermined continuous waves from an optical spectrum emitted from a pulsed light source with an optical injection locking.

14. An apparatus according to claim 5 or claim 6, wherein the local light source comprises:
means for generating the first optical local component and the second optical local component; and
a light source that emits two adjacent light waves.

15. An apparatus according to claim 5 or claim 6, wherein the local light source comprises:
means for generating the first optical local component and the second optical local component; and
means for selectively producing two light waves by modulating light from a single-mode light source.

16. A method comprising the steps of:
modulating an optical signal with a high-frequency signal and sending the modulated optical signal;
receiving the modulated optical signal;
combining the received modulated optical signal, a first optical local component from a local light source and a second optical local component from the local light source to produce an electrical signal which includes plural high-frequency electrical signal components, said second optical local component having a predetermined frequency differential relative to a predetermined frequency of the first optical local component;
selecting from said plural high-frequency electrical signal components a frequency-shifted carrier component obtained from the combining of the modulated optical signal with the first optical local component and a frequency-shifted sideband component obtained from the combining of the modulated optical signal with the second optical local component; and
combining the frequency-shifted carrier component and the frequency-shifted sideband component.

17. The method according to claim 16, wherein the combined frequency-shifted carrier component and the frequency-shifted sideband component form a first high-frequency electrical signal component.

18. The method according to claim 17, further comprising the step of:
selecting a second high-frequency electrical signal component having a frequency lower by an amount of the predetermined frequency differential relative to a carrier frequency of the first high-frequency electrical signal component.

19. The method according to claim 16, wherein the first and second optical local components are generated using an original high frequency signal extracted from the high frequency signals transmitted.

20. The method according to claim 16, wherein the step of selecting and the step of combining the frequency-shifted carrier component and the frequency-shifted sideband component are substituted with the steps of selecting a first optical signal and a second optical signal, mixing the first and second optical signals and selecting a signal with a lower frequency, in which the first optical signal is light including an optical sideband component included in the the first optical local component from the local light source, and the second optical signal is light including an optical carrier component included in the second optical signal and the second optical local component from the local light source.

21. An apparatus comprising:
means for modulating an optical signal with a high-frequency signal and sending the modulated optical signal;
means for receiving the modulated optical signal;
means for combining the received modulated optical signal, a first optical local component from a local light source and a second optical local component from the local light source to produce an electrical signal that includes plural high-frequency electrical signal components, said second optical local component having a predetermined frequency differential relative to a predetermined frequency of the first optical local component;
means for selecting from said plural high-frequency electrical signal components a frequency-shifted carrier component obtained from the combining of the modulated optical signal with the first optical local component and a frequency-shifted sideband component obtained from the combining of the modulated optical signal with the second optical local component; and
means for combining the frequency-shifted carrier component and the frequency-shifted sideband component.

22. The apparatus according to claim 21, wherein the combined frequency-shifted carrier component and the frequency-shifted sideband component form a first high-frequency electrical signal component.

23. The apparatus according to claim 22, further comprising:
means for selecting a second high-frequency electrical signal component having a frequency lower by an amount of the predetermined frequency differential relative to a carrier frequency of the first high-frequency electrical signal component.

24. The apparatus according to claim 21, wherein the first and second optical local components are generated using an original high frequency signal extracted from high frequency signals transmitted.

25. The apparatus according to claim 21, wherein the means for selecting and the means for combining are substituted with means for selecting a first optical signal and a second optical signal, means for mixing the first and second optical signals and means for selecting a signal with a lower frequency, in which the first optical signal is light including an optical sideband component included in the first optical local component from the local light source, and the second optical signal is light including an optical carrier component included in the second optical local component from the local light source.

26. The apparatus according to claim 22, further comprising:
means for generating the optical signal with a single-mode light source that produces a single-mode optical carrier; and means for generating the modulated optical signal, by modulating the optical signal by the high-frequency electrical signal component by optical modulation.

27. The apparatus according to claim 23, further comprising:
means for generating the optical signal with a single-mode light source that produces a single-mode optical carrier; and
means for generating the modulated optical signal, by modulating the optical signal by the high frequency signal by optical modulation.

28. The apparatus according to claim 24, further comprising:
means for generating the optical signal with a single-mode light source that produces a single-mode optical carrier; and
means for generating the modulated optical signal, by modulating the optical signal by the high frequency signal by optical modulation.

29. The apparatus according to claim 25, further comprising:
means for generating the optical signal with a single-mode light source that produces a single-mode optical carrier; and
means for generating an optical sideband component, which is the modulated optical signal, by modulating the optical carrier component by the high frequency signal by optical modulation.

30. The apparatus according to claim 22, wherein the means for combining projects plural light beams onto a photo-detector, thereby combining the plural light beams and converting the combined beams to the electrical signal.

31. The apparatus according to claim 23, wherein the means for combining projects plural light beams onto a photo-detector, thereby combining the plural light beams and converting the combined beams to the electrical signal.

32. The apparatus according to claim 24, wherein the means for combining projects plural light beams onto a photo-detector, thereby combining the plural light beams and converting the combined beams to the electrical signal.

33. The apparatus according to claim 25, wherein the means for combining projects plural light beams onto a photo-detector, thereby combining the plural light beams and converting the combined beams to the electrical signal.

34. The apparatus according to claim 30, wherein the photo-detector has a configuration of a balanced receiver.

35. The apparatus according to claim 31, wherein the photo-detector has a configuration of a balanced receiver.

36. The apparatus according to claim 32, wherein the photo-detector has a configuration of a balanced receiver.

37. The apparatus according to claim 33, wherein the photo-detector has a configuration of a balanced receiver.

38. The apparatus according to claim 22, wherein the local light source comprises:
means for generating the first and second optical local components; and
means for extracting two predetermined continuous waves from an optical spectrum emitted from a pulsed light source.

39. The apparatus according to claim 23, wherein the local light source comprises:
means for generating the first and second optical local components; and
means for extracting two predetermined continuous waves from an optical spectrum emitted from a pulsed light source.

40. The apparatus according to claim 24, wherein the local light source comprises:
means for generating the first and second optical local components; and
means for extracting two predetermined continuous waves from an optical spectrum emitted from a pulsed light source.

41. The apparatus according to claim 25, wherein the local light source comprises:
means for generating the first and second optical local components; and
means for extracting two predetermined continuous waves from an optical spectrum emitted from a pulsed light source.

42. The apparatus according to claim 22, wherein the local light source comprises:
means for generating the first and second optical local components; and
means for extracting two predetermined continuous waves from an optical spectrum emitted from a pulsed light source with an optical injection locking.

43. The apparatus according to claim 23, wherein the local light source comprises:
means for generating the first and second optical local components; and
means for extracting two predetermined continuous waves from an optical spectrum emitted from a pulsed light source with an optical injection locking.

44. The apparatus according to claim 24, wherein the local light source comprises:
means for generating the first and second optical local components; and
means for extracting two predetermined continuous waves from an optical spectrum emitted from a pulsed light source with an optical injection locking.

45. The apparatus according to claim 25, wherein the local light source comprises:
means for generating the first and second optical local components; and
means for extracting two predetermined continuous waves from an optical spectrum emitted from a pulsed light source with an optical injection locking.

46. The apparatus according to claim 22, wherein the local light source comprises:
means for generating the first and second optical local components that utilizes a light source that emits two adjacent light waves.

47. The apparatus according to claim 23, wherein the local light source comprises:
means for generating the first and second optical local components that utilizes a light source that emits two adjacent light waves.

48. The apparatus according to claim 24, wherein the local light source comprises:
means for generating the first and second optical local components that utilizes a light source that emits two adjacent light waves.

49. The apparatus according to claim 25, wherein the local light source comprises:
means for generating the first and second optical local components that utilizes a light source that emits two adjacent light waves.

50. The apparatus according to claim 22, wherein the local light source comprises:
means for generating the first and second optical local components; and means for selectively producing two light waves by modulating light from a single-mode light source.

51. The apparatus according to claim 23, wherein the local light source comprises:
   means for generating the first and second optical local components; and
   means for selectively producing two light waves by modulating light from a single-mode light source.

52. The apparatus according to claim 24, wherein the local light source comprises:
   means for generating the first and second optical local components; and
   means for selectively producing two light waves by modulating light from a single-mode light source.

53. The apparatus according to claim 25, wherein the local light source comprises:
   means for generating the first and second optical local components; and
   means for selectively producing two light waves by modulating light from a single-mode light source.

54. A method comprising the steps of:
   modulating an optical signal with a high-frequency signal having a frequency $f_{RF}$;
   sending the modulated optical signal;
   receiving the modulated optical signal;
   mixing the received modulated optical signal including a frequency $f_1$, a first optical local component having a first frequency $f_2+f_{LO}/2$ from a local light source, and a second optical local component having a second frequency $f_2-f_{LO}/2$ from the local light source to produce an electrical signal which includes plural electrical components, the first frequency and the second frequency being different from each other by a predetermined frequency differential $f_{LO}$;
   selecting a first electrical component from said plural electrical components, said selected first electrical component being a frequency-shifted carrier component having a frequency $f_1-f_2+f_{LO}/2$ obtained from the mixing of the modulated optical signal with the first optical local component;
   selecting a second electrical component from said plural electrical components, said selected second electrical component being a frequency-shifted sideband component having a frequency $f_{1-f2}+f_{RF}-f_{LO}/2$ obtained the mixing of the modulated optical signal with the second optical local component;
   mixing the first and second electrical components to produce a high-frequency electrical signal having a frequency $f_{RF}-f_{LO}$; and
   demodulating to provide an output signal having the frequency $f_{RF}$ with the high-frequency electrical signal having the frequency $f_{RF}-f_{LO}$.

* * * * *